United States Patent
Kossat

(10) Patent No.: US 7,874,742 B2
(45) Date of Patent: Jan. 25, 2011

(54) SPLICING DEVICE FOR OPTICAL FIBERS AND METHOD FOR OPERATING A SPLICING DEVICE FOR OPTICAL FIBERS

(75) Inventor: Rainer M. Kossat, Deutschland (DE)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/605,679

(22) Filed: Oct. 26, 2009

(65) Prior Publication Data

US 2010/0074582 A1   Mar. 25, 2010

Related U.S. Application Data

(63) Continuation of application No. PCT/EP2008/054812, filed on Apr. 21, 2008.

(30) Foreign Application Priority Data

Apr. 26, 2007  (DE)  ........................ 10 2007 019 796

(51) Int. Cl.
   G02B 6/255    (2006.01)
   C03B 37/15    (2006.01)

(52) U.S. Cl. ............................. 385/97; 385/95; 385/96; 65/406; 65/407

(58) Field of Classification Search ................. 385/95, 385/96, 97, 98, 99, 123, 52; 356/73.1; 65/385, 65/406, 407
   See application file for complete search history.

(56) References Cited

U.S. PATENT DOCUMENTS

| | | | | |
|---|---|---|---|---|
| 5,345,557 A | * | 9/1994 | Wendt | ........................ 710/100 |
| 6,591,054 B2 | * | 7/2003 | Afflerbaugh et al. | ........ 385/135 |
| 7,118,035 B2 | * | 10/2006 | Clark | ........................ 235/385 |
| 2002/0003934 A1 | | 1/2002 | Clark | ........................... 385/99 |
| 2002/0076134 A1 | * | 6/2002 | Singh | ........................... 385/16 |
| 2002/0146228 A1 | * | 10/2002 | Afflerbaugh et al. | ........ 385/135 |
| 2003/0210884 A1 | * | 11/2003 | Afflerbaugh et al. | ........ 385/135 |
| 2004/0218891 A1 | * | 11/2004 | Clark | ........................... 385/147 |
| 2006/0280417 A1 | | 12/2006 | Sato et al. | ................... 385/134 |
| 2010/0074582 A1 | * | 3/2010 | Kossat | ........................... 385/95 |

FOREIGN PATENT DOCUMENTS

| | | |
|---|---|---|
| EP | 0880039 A1 | 11/1998 |
| EP | 0890852 A2 | 1/1999 |
| EP | 1130429 A1 | 9/2001 |
| EP | 1174744 A1 | 1/2002 |
| WO | WO 2005/106548 A1 | 11/2005 |

OTHER PUBLICATIONS

CCS Product Catalogue: "Spleissystem fur den Feldeinsatz, Spleissgerate, Zubehor, Werkzeuge und Verbrauchsmaterial", DACH Edition, vol. 1, Jun. 1, 2005, pp. 1-76.

* cited by examiner

*Primary Examiner*—Brian M Healy

(57) ABSTRACT

A splicing device for optical fibers comprises a programmable splicing apparatus which can be controlled by means of at least one program parameter, for connecting optical fibers, and a speech recognition unit. Spoken text is detected via the speech recognition unit, and a spoken command is determined from the detected spoken text. The at least one program parameter of the splicing apparatus is adjusted and/or the splicing apparatus is controlled as a function of the determined spoken command.

31 Claims, 3 Drawing Sheets

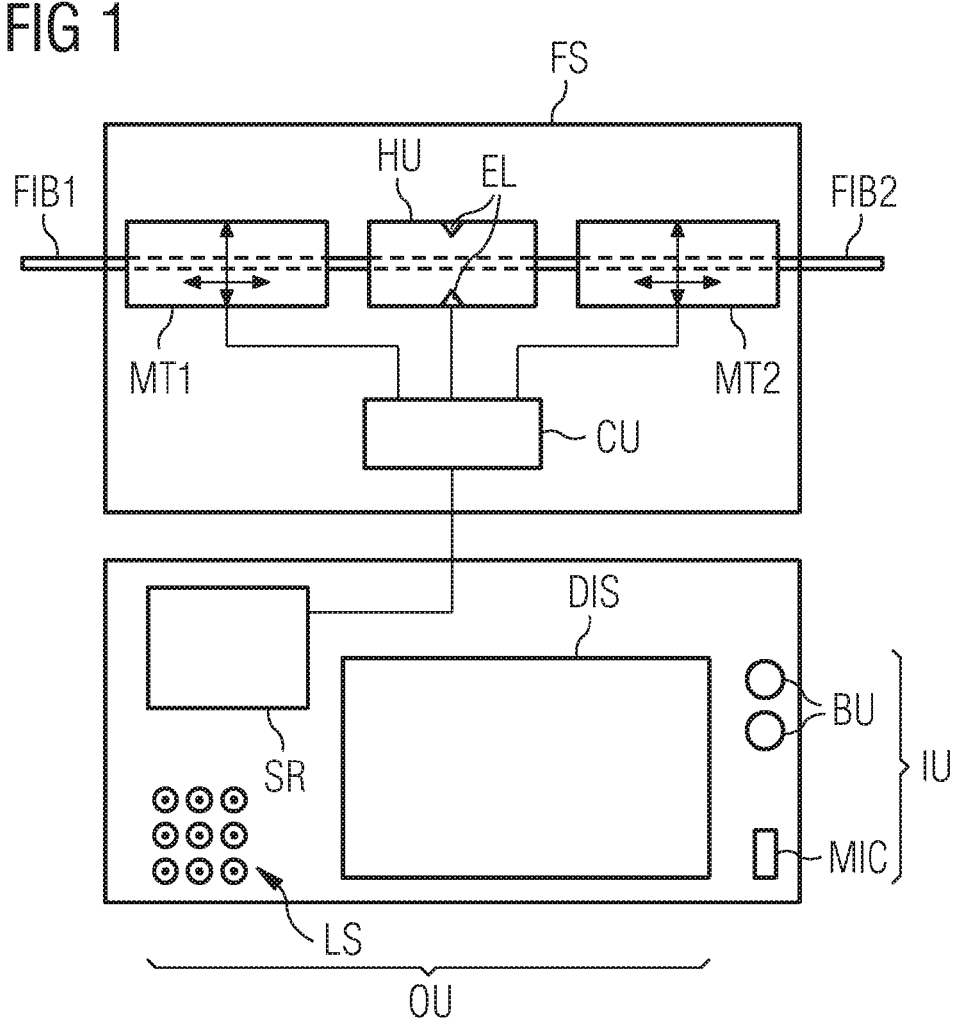
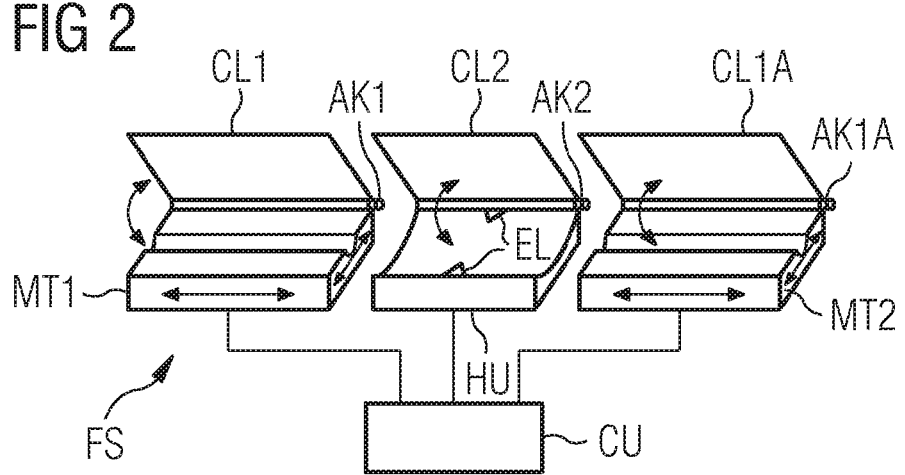

SPLICING DEVICE FOR OPTICAL FIBERS AND METHOD FOR OPERATING A SPLICING DEVICE FOR OPTICAL FIBERS

RELATED APPLICATIONS

This application is a continuation of International Application No. PCT/EP2008/054812, filed Apr. 21, 2008, which claims priority to German Application No. DE102007019796.0, filed Apr. 26, 2007, both applications being incorporated herein by reference.

FIELD

The disclosure relates to a splicing device for optical fibers and to a method for operating a splicing device for optical fibers.

BACKGROUND

Optical fibers or optical waveguides which are formed, for example, from glass fibers or plastic fibers can be spliced, that is to say connected to one another, in a splicing device. The splicing device aligns the two ends of the fibers to be spliced with respect to one another, and melts them thermally, for example by welding by means of an arc.

In this case, a user interface is generally available for control of the splicing device, and is in the form of a graphics interface or a text-based menu. A user communicates with the splicing device via this user interface.

Particularly in the case of a splicing device, the user interface may use a menu, which reflects the complex requirements for control of the device. In some circumstances, only a small number of buttons are available as an input device for control purposes, by means of which a multiplicity of functions of the splicing device are intended to be controlled.

For example, a plurality of different programs for connecting different fiber types in each case are available in the splicing device. Furthermore, parameters for the spicing process can in this case be adjusted, such as a splicing current to be used, a desired feed for the fibers during the splicing process, or the fiber type to be spliced.

For a splicing process, a user inserts the optical fibers to be spliced, or their fiber ends, into appropriate holders after previous treatment that is normally required, in which holders the optical fibers are fixed by manually closing respective flaps. Since an optical fiber is generally held and inserted using one hand, and the flap is closed using the other hand, the optical fibers can in each case be inserted into the splicing device only successively. In the case of a device which can be held in the hand, the insertion of the optical fibers and the closing of the corresponding flaps are considerably more difficult.

As the splicing process progresses, the melting of the optical fibers and any measurement processes are started by selecting appropriate menu items. During this process, once again, only one hand of the user is normally free, for example, for holding the optical fibers, since the other hand is required to control the user interface. This can result in a higher mechanical load on the optical fibers, which in some circumstances leads to effects on the quality of the splice point. A user of the splicing device can therefore be confronted with the problem of actually wishing to have both hands free for handling the optical fibers, even though one hand is required for operating the user interface of the splicing device. This can lead to disadvantageous effects on the time for carrying out a complete splicing process and on the quality of the splice point of the optical fibers.

SUMMARY

A splicing device for optical fibers as well as a method for operating a splicing device which allows simpler control is disclosed.

In one exemplary embodiment of a splicing device for optical fibers, the splicing device comprises a programmable splicing apparatus which can be controlled by means of at least one program parameter, for connecting optical fibers, as well as a speech recognition unit. The speech recognition unit is designed to detect spoken text, to determine a spoken command from the detected spoken text and to adjust the at least one program parameter of the splicing apparatus and/or to control processes of the splicing apparatus as a function of the determined spoken command.

The speech recognition unit therefore provides a user interface for a user of the splicing device, which allows processes to be initiated on or in the splicing device by means of spoken words or spoken text. The spoken text is in this case detected digitally, for example, as an audio signal. A spoken command is determined from this, for example by comparison with commands stored in the speech recognition unit. The stored spoken commands can be associated with a very wide range of actions and/or program parameters of the programmable splicing apparatus, which actions are carried out by the splicing apparatus after the appropriate spoken command has been determined in the speech recognition unit. Since the splicing device can therefore be operated by speech control, a user of the splicing device has both hands free for control of the splicing device and for handling the optical fibers to be spliced. This therefore advantageously simplifies the control process.

In one embodiment of a method for operating a splicing device for optical fibers, a programmable splicing apparatus which can be controlled by means of at least one program parameter is provided for connecting optical fibers. Spoken text is detected and a spoken command is determined from the detected spoken text. The at least one program parameter of the splicing apparatus is adjusted and/or processes of the splicing apparatus are controlled as a function of the determined spoken command.

Determining a spoken command from spoken text, as a function of which processes in the splicing device can be controlled, advantageously allows the splicing device to be controlled more easily. In this case, the processes or actions are preferably controlled before or during a splicing process.

BRIEF DESCRIPTION OF THE FIGURES

The invention will be explained in more detail in the following text using a plurality of exemplary embodiments and with reference to the figures. Elements which have the same function and/or effect have the same reference symbols.

FIG. 1 shows a first exemplary embodiment of a splicing device,

FIG. 2 shows a first exemplary embodiment of a splicing apparatus,

DETAILED DESCRIPTION

Figure 3:
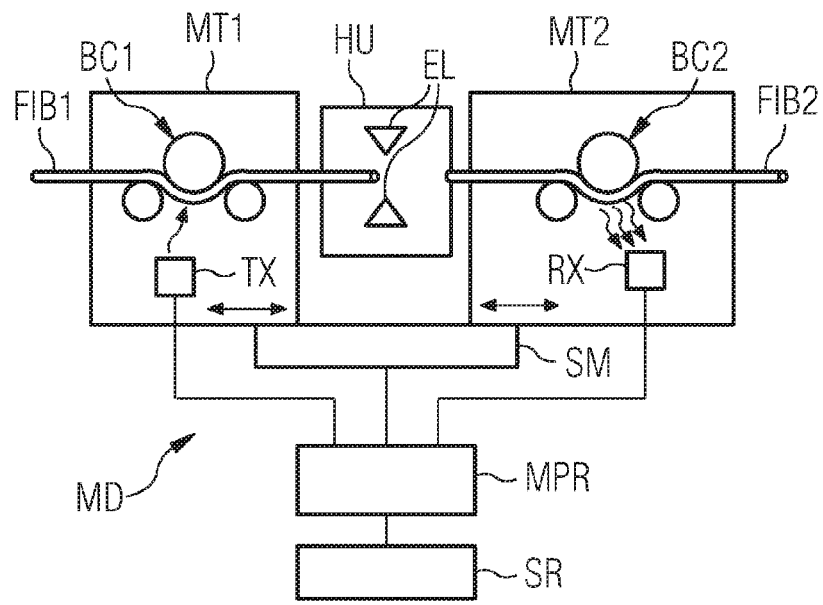
FIG. 3 shows a second exemplary embodiment of a splicing device.

FIG. 1 shows an exemplary embodiment of a splicing device for optical fibers, having a programmable splicing apparatus FS which can be controlled by means of at least one program parameter, for connecting optical fibers FIB1, FIB2. In this case, the splicing apparatus FS comprises a control unit CU, which is coupled to a speech recognition unit SR of the splicing device. A first and a second moving holding apparatus MT1, MT2 as well as a heating apparatus HU are also connected to the control unit CU and are likewise elements of the splicing apparatus FS. The holding apparatuses MT1, MT2 are designed to hold and align the optical fibers FIB1, FIB2 with respect to one another such that the ends of the optical fibers FIB1, FIB2 are arranged appropriately with respect to one another in the heating apparatus HU for heating during a splicing process via electrodes EL. By way of example, an arc can be produced via the electrodes EL of the heating apparatus HU, and this arc is used to melt the optical fibers. In other embodiments, the heating apparatus HU may also have other means for heating the optical fibers FIB1, FIB2 during a splicing process.

The splicing device furthermore comprises an input device IU, which has a microphone MIC as well as control knobs BU. The microphone MIC is coupled to the speech recognition unit SR, for example via an analog/digital converter, which is not shown here. An analog/digital converter can also be an element of the speech recognition unit SR and/or may be integrated in it. The splicing device furthermore comprises an output device OU with a loudspeaker LS and a screen DIS. By way of example, the loudspeaker LS is coupled via an audio processor or a digital/analog converter to the speech recognition unit SR. The speech recognition unit SR may have a graphics interface or may be coupled to a graphics interface in order to control the screen DIS.

In this exemplary embodiment, the control unit CU can be used to control processes which are related to a splicing process for the optical fibers FIB1, FIB2. For example, a movement of the holding apparatuses MT1, MT2 in the splicing apparatus FS is controlled before and/or during a splicing process. By way of example, the holding apparatuses MT1, MT2 are moved as a function of an evaluation of camera images of known cameras, which are not shown here for clarity reasons, for observing the optical fibers FIB 1, FIB2.

A first and a second or else further splicing programs with respective program parameters can be stored in the control unit CU, with these program parameters being provided, for example, for different types of optical fibers. By way of example, the program parameters relate to a splicing current for the electrodes EL during a splicing process, or to a feed, which is supplied to the optical fibers FIB1, FIB2 during the splicing process via the holding apparatuses MT1, MT2. However, the program parameters may also comprise a multiplicity of further variables which relate to the procedure for the splicing process. In other words, the program parameters used in the control unit CU are used in a general form to control the splicing apparatus FS.

The speech recognition unit SR is designed to detect spoken text. By way of example, spoken words or user commands are detected via the microphone MIC as an audio signal and are converted to a digital signal, for example, via an analog/digital converter. The spoken text which has been detected in this way, to be precise the audio signal detected in this way, is evaluated, for example, by comparison with known, stored signal sections, each of which can be associated with a specific spoken text. Alternatively, or additionally, the evaluation or the comparison is carried out in the frequency domain, that is to say by frequency analysis of the detected spoken text or of the audio signal. By way of example, the digitized audio signal is for this purpose converted via a discrete Fourier transformation DFT to the frequency domain, in order to determine sounds in the spoken text by frequency analysis, and to derive from this the spoken text in a format which can be evaluated digitally. In this case, the spoken text may comprise one, two or more words. As a result of the described evaluation, the speech recognition unit SR is therefore able to determine a spoken command from the detected spoken text.

In this case, by way of example, a spoken command corresponds to a menu item which is indicated via the screen DIS or is output via the loudspeaker LS, and which is intended to initiate an action on or in the splicing device. However, it is also possible for one spoken command to correspond to a combination of a plurality of possibly interleaved menu items.

The speech recognition unit SR can adjust at least one program parameter for controlling the splicing apparatus FS, as a function of the determined spoken command. Alternatively, or additionally, the speech recognition unit SR can also control the splicing apparatus as a function of the determined spoken command.

The splicing device can therefore be controlled by spoken text, which is converted to spoken commands. This corresponds essentially to menu control, in which, for example, menu items or a sequence of menu items are selected via a speech input, instead of by pressing keys or areas of a touch-sensitive display, associated with corresponding commands.

A user can in this case enter a spoken command in its own right, that is to say he can speak appropriate text, which leads to an associated action or program change in the splicing apparatus or in the splicing device. Alternatively, or additionally, a request to input a spoken command or appropriate text can be made via the output device OU, thus activating or initiating the execution of an action in the splicing device or a program change, in a simple manner. For example, the user can be asked a question via the output device OU: "Start splicing process?" This can be answered at the appropriate time, as selected by the user, by inputting, for example, "Yes" or "Start", in order to initiate the execution of the proposed process in the splicing device.

In one exemplary embodiment, the speech input can also control a semiautomatic splicing process, that is to say a splicing process which is not defined completely by a stored splicing program. In this case, the user enters and initiates individual program steps as a component of a splicing process via respective appropriate spoken commands. For example, this makes it possible to individually input individual splicing parameters such as the splicing current or fiber feed during the splicing process, or else information relating to the fiber type and material, which information is passed on as at least one appropriate program parameter to the splicing apparatus FS. This makes it possible, for example, to use the splicing device individually for experiments or tests in a laboratory.

The outputs which are produced by the splicing device via the screen DIS, for example status messages relating to the status of the splicing device or of optical fibers to be spliced or being spliced, as well as control options for the device, can alternatively or additionally be output via the loudspeaker LS, in one exemplary embodiment. In this case, it is also possible to dim and/or to switch off the screen DIS during the audible output of the information just mentioned. This makes it possible to reduce the current drawn in the splicing device, which, for example in the case of a transportable splicing device, leads to an increased rechargeable-battery operating time and thus to a longer operating time of the splicing device. Alternatively, the screen can be used to output video images of the splicing process without having to reduce the display area of the screen DIS by menu items or status messages being displayed. The user can thus better monitor and observe the progress of the splicing process.

In one exemplary embodiment, an output is produced on the screen DIS only when a fault message or a result of a splicing process which is poorer than a predetermined tolerance threshold is intended to be output. Otherwise, that is to say when a splicing process is carried out normally in accordance with the requirements, the screen DIS remains switched off or at least dimmed. By way of example, the screen DIS is in the switched-off or dimmed state in a power-saving mode.

In a further exemplary embodiment, an output is produced on the screen DIS as a function of the environmental brightness. For example, outputs are produced on the screen DIS only in the situation in which these outputs can also be assumed by a user in a given or measured brightness. Otherwise, an output is produced only or additionally audibly.

Alternatively, in the case of a splicing device which is both controlled via spoken commands and audible outputs a menu selection or status messages, the screen DIS can also be omitted which, inter alia, allows physically smaller physical forms of a splicing device and leads to lower production costs.

FIG. 2 shows one exemplary embodiment of a programmable splicing apparatus FS which, for example, can be used in the exemplary embodiment shown in FIG. 1. The splicing apparatus FS in this case comprises the first and the second holding apparatus MT1, MT2 as well as the heating apparatus HU, which are each coupled to the control unit CU. The holding apparatuses MT1, MT2 each have grooves for inserting optical fibers, which are not shown here, and are mounted such that they can move, for positioning of the optical fibers. The optical fibers can be fixed in the holding apparatuses MT1, MT2 during a splicing process via respective flaps CL1, CL1a, which can be opened and closed via actuators AK1, AK1a.

The heating apparatus HU also has a flap CL2, which can be operated via an actuator AK2. The flap CL2 is used inter alia both for protection of the optical fibers during a welding process, or melting by means of the electrodes EL, and for protection of a user against currents, temperature and other influences which originate from the heating apparatus HU while the optical fibers are being heated.

For this exemplary embodiment, the corresponding speech recognition unit SR is designed to control the operation, that is to say the opening and/or closing of the flaps CL1, CL1a of the holding apparatuses MT1, MT2, as a function of a corresponding determined spoken command. By way of example, a user inserts a first and a second optical fiber to be connected into the first and the second holding apparatus MT1, MT2 and speaks the text "Close holding apparatus flaps" into the microphone MIC. The speech recognition unit SR determines the appropriate spoken command from this, and emits the control signals or program parameters required to close the flaps CL1, CL2 to the control unit CU, which then closes the flap.

Alternatively, the optical fibers to be connected can also be inserted individually, such that the user, for example, inserts a first optical fiber into the first holding apparatus MT1 and initiates the closure of the flap CL1 by means of the example of a spoken command "Close left flap". The second flap CL1a of the second holding apparatus MT2 can be closed in an analogous manner by the example of a spoken command "Close right flap".

In an alternative exemplary embodiment, the splicing apparatus FS recognizes, for example via appropriate sensors, that an optical fiber has been inserted in a holding apparatus MT1, MT2, and for example, outputs the question "Close left flap?" to the user via the output device OU, which is not illustrated here. Operation of the flap CL1 can now be activated by a spoken user input, for example "Yes". The second, right flap CL1a can in turn be operated in a corresponding manner.

The flap CL2 of the heating apparatus HU can also be opened and closed as a function of a determined spoken command. For example, the user can input the spoken command "Close central flap" in order to close the flap CL2 of the heating apparatus HU. Alternatively, the output device OU can ask the user an appropriate question, such as "Close central flap?", which the user can confirm by a spoken input, for example "Yes", in order to cause the flap CL2 to be operated.

The actual splicing process in the heating apparatus HU can be controlled by a further spoken command spoken by the user. In other words, the speech recognition unit SR is designed to control the splicing process and heating of the optical fibers during a splicing process as a function of the determined spoken command.

The texts mentioned in the exemplary embodiments, which a user speaks as a spoken command, or which are output from the output device, represent only different embodiments of possible texts and can be replaced by other texts.

FIG. 3 shows a further exemplary embodiment of a splicing device for optical fibers, illustrated schematically. The holding apparatuses MT1, MT2 in this case each comprise a bending coupler BC1, BC2 which moves the optical fibers FIB1, FIB2 to a bent or curved position during the splicing process or while being held. Furthermore, a measurement apparatus MD is provided, which comprise a measurement processor MPR, a radiation-emitting transmitter TX which is arranged in the first holding apparatus MT1, and a radiation-detecting receiver RX, which is arranged in the second holding apparatus MT2. Furthermore, a tensile strength sensor SM is provided as part of the measurement apparatus MD via which the tensile strength of the spliced optical fibers FIB1, FIB2 can be measured. The measurement processor MPR is connected to the speech recognition unit SR, such that a measurement process in the measurement apparatus MD can be controlled as a function of a correspondingly determined spoken command. By way of example, this can be done via appropriate program parameters.

The bending of the optical fibers FIB1 by the bending coupler BC1 makes it possible to inject the radiation emitted from the transmitter TX, in particular light radiation such as infrared light, into the fiber FIB1, that is to say it is introduced into a fiber core of the optical fibers FIB1 for transportation.

In a corresponding manner, a light output of light radiation transported through the fiber FIB2 is possible by bending of the optical fiber FIB2 by the bending coupler BC2, and this can be recorded and detected by the transmitter RX. During a splicing process, the optical fibers FIB1, FIB2 are connected to one another by welding via the electrodes EL such that light is injected from the first optical fiber FIB1 into the second optical fiber FIB2. In other words, the fibers FIB1, FIB2 are optically connected to one another.

When optical fibers FIB1, FIB2 have been connected, the radiation emitted from the transmitter TX can thus be injected into the first fiber FIB1 and can be output from the second fiber FIB2, in order to be recorded by the receiver RX. On the basis of a comparison of the intensity of the emitted radiation from the transmitter TX and the radiation detected at the receiver RX, it is possible to determine the attenuation of the splice point, that is to say the connected point of the optical fibers FIB1, FIB2. A system such as this for determining attenuation of optical fibers is also referred to as a system for light injection and detection, LID. An attenuation measurement based on the described principle can be carried out both during a splicing process and after a splicing process. For example, an attenuation measurement after the splicing process can be associated with an appropriate spoken command, which leads to initiation of the measurement process when the user makes a spoken input.

However, in the exemplary embodiment illustrated in FIG. 3, it is possible not only to measure the attenuation of a spliced connection but also a tensile strength, that is to say the load capability of the splice point. For example, the tensile strength sensor SN comprises a piezo-element which converts a force acting on it to a measurement signal which is evaluated by the measurement processor MPR. During a measurement process, for example, the first and the second holding apparatuses MT1, MT2 are moved away from one another in order to produce a load on the splice point. At the same time, the force acting on the splice point is determined by means of the tensile strength sensor SN. For example, this makes it possible to test whether the splice point will withstand a specific predetermined force without being damaged.

The tensile strength measurement can also be initiated by means of an appropriate spoken text as a spoken command.

Figure 4:
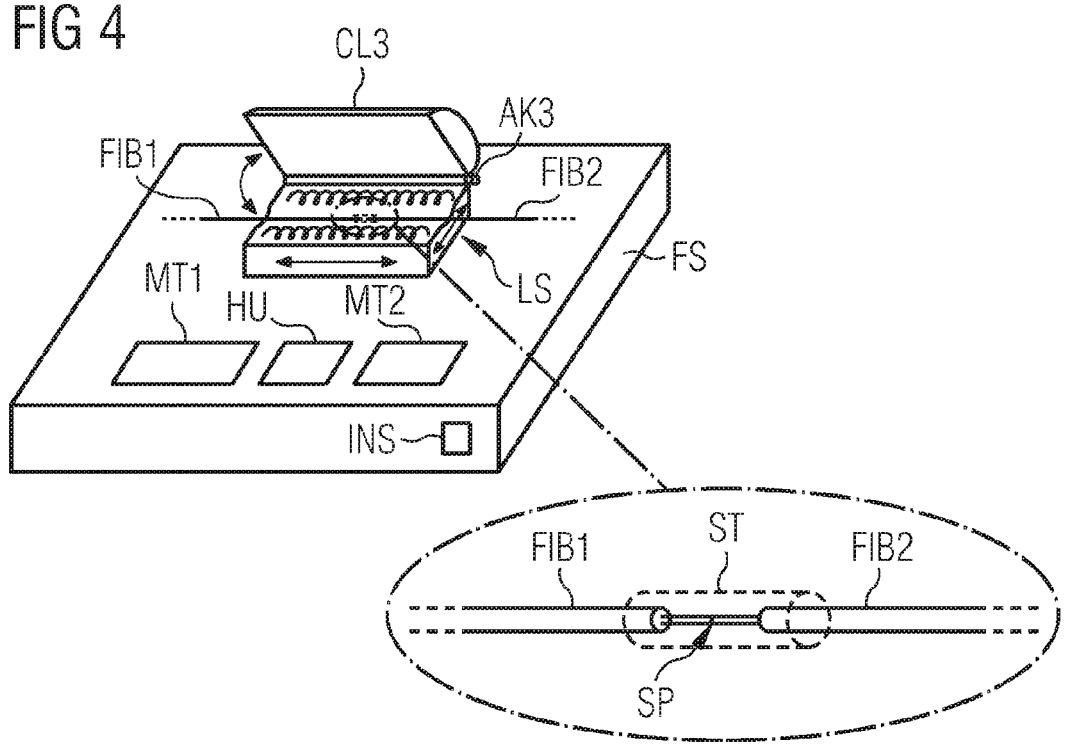
FIG. 4 shows a second exemplary embodiment of a splicing apparatus.

FIG. 4 shows a further exemplary embodiment of a splicing apparatus FS with a shrinking oven HS, by means of which a shrink sleeve ST, which is shown enlarged, can be shrunk onto a splice point SP of the optical fibers FIB1, FIB2 which have been connected in the splicing apparatus. The shrinking oven HS has schematically illustrated heating spirals via which the shrink sleeve ST can be heated. Furthermore, the shrinking oven HS has a flap CL3 which can be operated via a further actuator AK3. For example, the speech recognition unit SR is designed to control opening and/or closing of the flap CL3 via the actuator AK3 as a function of the determined spoken command.

By way of example, after thermal connection of ends of the optical fibers FIB1, FIB2 by the heating apparatus HU, a shrink sleeve SP is fitted over the normally exposed area of the optical fibers. Inter alia, the shrink sleeve SP offers mechanical protection for the splice point SP. For this purpose, the spliced optical fibers FIB1, FIB2 are inserted into the shrinking oven HS with the shrink sleeve ST that has not yet been shrunk. Closing of the flap CL3, which, for example, is carried out in case of a conventional shrinking oven by mechanical loading of a spring with the spliced optical fibers, can be controlled by a user inputting a spoken command. When the flap CL3 has been closed, the shrinking process, during which the shrink sleeve ST is shrunk onto the splice point by heating, can be initiated as a function of a further spoken command spoken by a user. In other words, the speech recognition unit is designed to control a shrinking process in the shrinking oven as a function of a determined spoken command. After the shrinking process, the flap CL3 can also be opened again by a spoken command.

Depending on the types of optical fibers and types of shrink sleeves used, it may be necessary to be possible to carry out different shrinking programs which are respectively matched to the corresponding fibers and shrink sleeves. In one exemplary embodiment, the speech recognition unit SR is designed to select a shrinking program from a set of a first and an at least second shrinking program as a function of a determined spoken command. In other words, a user can use an appropriate spoken command to select which shrinking program should be used from a multiplicity of shrinking programs which can be selected for the shrinking process.

Figure 5:
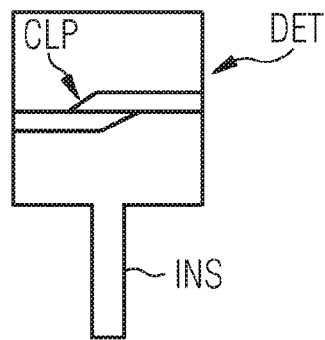
FIG. 5 shows an exemplary embodiment of a trimming device.

The splicing apparatus FS furthermore has an insert NS of a trimming device DET, which is shown in FIG. 5. Optical fibers can be prepared for a splicing process by means of the trimming device DET. First of all, an optical fiber to be spliced is inserted into the insert NS. With reference to FIG. 5, the trimming device DET which comprises the insert NS is used to remove an outer coating from an optical fiber at the splice point at which the optical fiber is intended to be spliced to another optical fiber. The trimming device DET is thus in the form of a stripping apparatus which, for example, has a cutting tool CLP. The speech recognition unit SR is in this case designed, for example, to control a trimming process in the trimming device DET as a function of a determined spoken command.

Even if the trimming device DET is integrated in the splicing apparatus FS in the exemplary embodiments as shown in FIGS. 4 and 5, an external trimming device can also be provided for the splicing device, in which a trimming process can be controlled by the speech recognition unit SR as a function of a determined spoken command.

Figure 6:
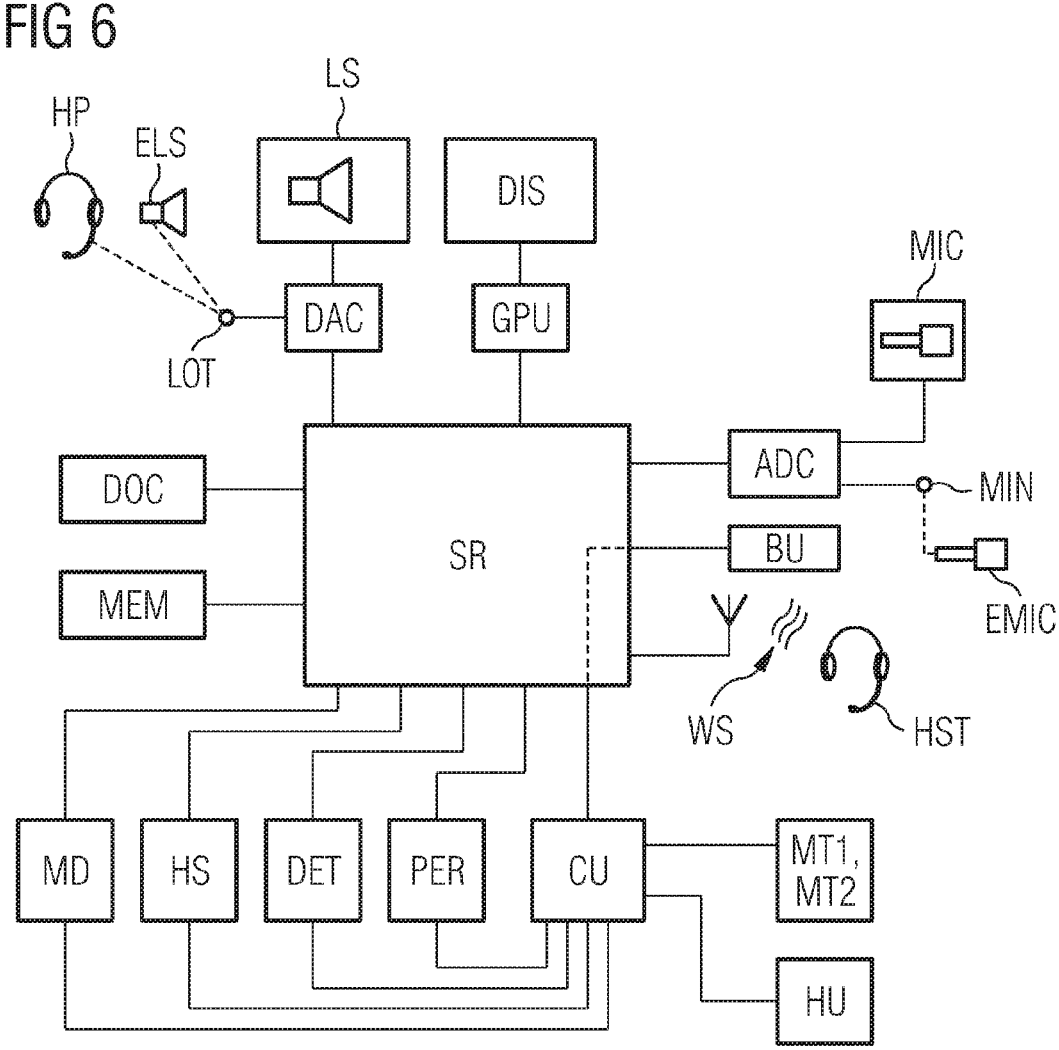
FIG. 6 shows a third exemplary embodiment of a splicing device.

FIG. 6 shows a further exemplary embodiment of a splicing device illustrated in the form of a block diagram. The microphone MIC, which is in the form of an internal microphone, is connected to the speech recognition unit SR via an analog/digital converter ADC. Furthermore, the analog/digital converter has a microphone connection MIN via which an external microphone EMIC can additionally or alternatively be connected. Furthermore, in addition to the microphones MIC, EMIC, control knobs BU are connected as a further element of the input device IU to the speech recognition unit SR, although these can also be coupled directly to the control unit CU.

As elements of the output device OU, the screen DIS is connected to the speech recognition unit SR via a graphics unit GPU, and the internal loudspeaker LS is connected to the speech recognition unit SR via an analog/digital converter DAC. The digital/analog converter DAC furthermore has a loudspeaker output LOT to which an external loudspeaker ELS or a headset HP can additionally or alternatively be connected.

Status messages and/or control options of the splicing device can therefore be output to the screen DIS and/or to the internal loudspeaker LS and/or to the externally connected loudspeaker ELS or headset HP.

The speech recognition unit SR in this exemplary embodiment also has a wire-free interface WS, to which a wire-free speech fitting HST, which is also referred to as a headset, can be connected instead of wire-connected loudspeakers and microphones. In this case, a speech fitting essentially comprises a headset with an integrated microphone thus allowing both the speech input, that is to say the detection of spoken text, and a speech output to be provided via the speech fitting HST. For example, the wire-free interface WS is in the form of a commercially available Bluetooth interface, so that any desired Bluetooth speech fittings, such as those which are also known from the field of mobile radio, can be used.

In addition, the control unit CU, the measurement device MD, the shrinking oven HS, the trimming device DET and an external peripheral device PER are connected to the speech recognition unit SR. In this case, the measurement apparatus MD, the shrinking oven HS, the trimming device DET and the external peripheral device PER can be coupled to the speech recognition unit SR both directly and via the control unit CU. The holding apparatuses MT1, MT2 and the heating apparatus HU are connected to the control unit CU, as described in the above exemplary embodiments.

In this exemplary embodiment, the speech recognition SR unit is designed to control the external peripheral device PER as a function of the determined spoken command. The external peripheral device PER may in this case, for example, be an external instrument, an external trimming device, some other processing tool for optical fibers before the splicing process, or an external shrinking oven, which can each be controlled as a function of the determined spoken command. However, other external devices which can be used in conjunction with a splicing process can also be connected. Externally connected devices such as these preferably have a microprocessor and are connected to the splicing device via a special bus system. By way of example, the external device can be controlled via an I2C bus. However, a plurality of external peripheral devices which can be controlled as a function of a respective determined spoken command can also be connected to the splicing device.

In this exemplary embodiment, the splicing device furthermore has a documentation memory DOC for storing data which can be associated with a respective splicing process, in which case the speech recognition unit SR is designed to store further detected spoken text as a function of the determined spoken command in the documentation memory. The further detected spoken text is can in this case be stored in the documentation memory DOC both as a digitized audio signal and in a text is format. In the case in which the further detected text is stored in a text format, the spoken text is converted to the text format via the speech recognition unit SR.

By way of example, a designation of a bundle in which the optical fibers to be spliced is contained, as well as the covering color of the spliced optical fibers, can be entered as a protocol entry for each splicing process, for documentation purposes. In addition, information relating to a measured tensile strength and/or a measured attenuation of the respective splice point is stored automatically in the documentation memory, in order subsequently to have a unique relationship between measurement data and the actually spliced optical fibers. In this case, the documentation can also be provided via a dialogue in which the speech recognition unit uses the output device OU to request appropriate data from a user, who enters this as spoken text which is in each case stored, associated with the corresponding question, in the documentation memory DOC.

A multiplicity of spoken commands which can be determined can be stored in a memory unit MEM connected to the speech recognition unit SR. For example, the speech recognition unit SR compares the detected spoken text with the spoken commands stored in the memory unit MEM in order to determine the spoken command respectively intended by the user. As already described above, the determination process can be carried out not only in the time domain, that is to say by direct comparison of the detected audio signal with a reference signal section, but also in the frequency domain. An appropriate action in the splicing device is also associated with each spoken command which can be determined, for example, in the memory unit MEM. Respectively associated program parameters can also be stored in the memory unit MEM, for the multiplicity of spoken commands which can be determined.

In one exemplary embodiment, the speech recognition unit is designed to determine spoken commands from detected spoken text as a function of a first and/or an at least second individual language. For example, the speech recognition unit SR is able to recognize spoken commands in different individual languages such as German, English, French or some other national language. In this case, spoken commands can be recognized automatically in various individual languages, or they are recognized from a set of available individual languages as a function of a respectively selected language for control of the splicing device. By way of example, the speech recognition unit SR is designed to select one individual language as the language for control of the splicing device as a function of an appropriate determined spoken command, as a result of which further spoken commands in this language are expected for control of the splicing device. In this case, appropriate outputs can also be made via the output device OU, that is to say for example the loudspeaker LS and the screen DIS in the selected individual language. The spoken commands in the various individual languages can once again be stored in the memory unit MEM.

In one exemplary embodiment, the speech recognition unit SR can, for example, recognize a user on the basis of a voice profile, in such a way that specific control parameters of the splicing device can be set automatically for this user. The information relating to the user can also be stored, for example, in the documentation memory DOC relating to the record data of a respective splicing process.

A splicing device according to one of the described exemplary embodiments thus assists a user of the splicing device to control the device. For example, the user additionally has at least one hand free during a splicing process, which would otherwise be required to close flaps, to press control buttons, or for similar activities. This can be particularly advantageous in the case of a splicing device which can be held in the hand, and which is also referred to as a handheld splicing device since, in this case, one hand is in any case required to hold the device, and only one hand is available for other actions.

When all the outputs of the splicing device are provided by a loudspeaker LS, a headset or a speech fitting, it is also possible to dispense with the provision of a screen. Smaller physical forms can therefore be provided for the splicing device, in comparison to conventional splicing devices. Furthermore, a splicing device without a screen can be produced more cheaply.

Although only a number of specific refinements have been illustrated and described, a person skilled in the art will in any case see that any arrangement which is suitable for carrying out the proposed principle can be replaced by the stated refinements. It is clear to a person skilled in the art that the above description is intended primarily for explanation of the inventive principle and is therefore also not restrictive. In particular, the description is not restricted to the described embodiments.

The application covers all modifications and variations of the disclosure. Combinations of the above refinements and further embodiments will be directly evident to a person skilled in the art, with the aid of the above description. The scope of the invention also extends to applications which use the disclosed arrangements and methods.

I claim:

1. A splicing device for optical fibers, comprising:
   a programmable splicing apparatus which can be controlled by means of at least one program parameter, for connecting optical fibers; and
   a speech recognition unit which is designed to detect spoken text, to determine a spoken command from the detected spoken text and to adjust the at least one program parameter of the splicing apparatus and/or to control processes of the splicing apparatus as a function of the determined spoken command.

2. The splicing device of claim 1, wherein the splicing apparatus has a first and an at least second splicing program for controlling the splicing apparatus, which are each defined by at least one program parameter and in which the speech recognition unit is designed to select one splicing program from the set of the first and of the at least one second splicing program as a function of the determined spoken command.

3. The splicing device of claim 1, wherein the splicing apparatus has at least one holding apparatus for at least one of the optical fibers with a first flap, which can be operated via an actuator, and in which the speech recognition unit is designed to control opening and/or closing of the first flap as a function of the determined spoken command.

4. The splicing device of claim 1, wherein the splicing apparatus has a heating apparatus for heating the optical fibers during a splicing process, and in which the speech recognition unit is designed to control the splicing process as a function of the determined spoken command.

5. The splicing device of claim 4, wherein the heating apparatus has a second flap which can be operated via a further actuator, and in which the speech recognition unit is designed to control opening and/or closing of the second flap as a function of the determined spoken command.

6. The splicing device of claim 1, wherein the splicing apparatus has a measurement apparatus for measuring an attenuation and/or a tensile strength of the optical fibers, and in which the speech recognition unit is designed to control a measurement process as a function of the determined spoken command.

7. The splicing device of claim 1, wherein the splicing apparatus has a shrinking oven, by means of which a shrink sleeve can be shrunk onto a splice point of the optical fibers connected in the splicing apparatus, and in which the speech recognition unit is designed to control a shrinking process in the shrinking oven as a function of the determined spoken command.

8. The splicing device of claim 7, wherein the shrinking oven has a third flap which can be operated via a further actuator, and in which the speech recognition unit is designed to control opening and/or closing of the third flap as a function of the determined spoken command.

9. The splicing device of claim 7, wherein the shrinking oven has a first and an at least second shrinking program, and in which the speech recognition unit is designed to select a shrinking program from the set of the first and of the at least one second shrinking program as a function of the determined spoken command.

10. The splicing device of claim 1, wherein the splicing apparatus has a trimming device for trimming the optical fibers, and in which the speech recognition unit is designed to control a trimming process in the trimming device as a function of the determined spoken command.

11. The splicing device of claim 1, wherein a connection is provided for an external peripheral device, and in which the speech recognition unit is designed to control the peripheral device as a function of the determined spoken command.

12. The splicing device of claim 1, wherein the speech recognition unit has an internal microphone and/or a microphone connection for an external microphone.

13. The splicing device of claim 1, wherein the speech recognition unit is designed to determine the spoken command from the detected spoken text as a function of a first and/or an at least second individual language.

14. The splicing device of claim 1, wherein the speech recognition unit has a memory unit in which a multiplicity of spoken commands which can be determined are stored.

15. The splicing device of claim 1, the splicing device comprises an output device for outputting status messages and/or control options of the splicing device.

16. The splicing device of claim 15, wherein the output device has a screen.

17. The splicing device of claim 16, wherein the screen can be switched off and/or can be dimmed.

18. The splicing device of claim 15, wherein the output device has an internal loudspeaker and/or a connection for an external loudspeaker or headset.

19. The splicing device of claim 15, wherein a wire-free interface is provided for connecting a speech fitting.

20. The splicing device of claim 1, further comprising a documentation memory for storing data which can be associated with a respective splicing process, in which the speech recognition unit is designed to store further detected spoken text as a function of the determined spoken command in the documentation memory.

21. The splicing device of claim 20, wherein the speech recognition unit is designed to store the further detected spoken text in a text format in the documentation memory.

22. A method for operating a splicing device for optical fibers, comprising the following steps:
providing a programmable splicing apparatus which can be controlled by means of at least one program parameter, for connecting optical fibers;
detecting a spoken text;
determination of a spoken command from the detected spoken text;
adjustment of the at least one program parameter of the splicing apparatus and/or control of processes of the splicing apparatus in each case as a function of the determined spoken command.

23. The method of claim 22, wherein the spoken command is determined as a function of a first and/or an at least second individual language.

24. The method of claim 22, wherein the spoken command is determined from a multiplicity of stored spoken commands which can be determined.

25. The method of claim 22, further comprising an output of status messages and/or control options of the splicing device.

26. The method of claim 25, wherein the output is provided on a screen.

27. The method of claim 25, wherein the screen is switched off and/or dimmed as a function of status messages to be output.

28. The method of claim 25, wherein the output is provided to an internal loudspeaker and/or to an externally connected loudspeaker or headset.

29. The method of claim 25, wherein the spoken text is detected and/or the output is provided by means of a speech fitting which is connected via a wire-free interface.

30. The method of claim 22, wherein further detected spoken text is stored as a function of the determined spoken command in a documentation memory for storing data which can be associated with a respective splicing process.

31. The method of claim 30, wherein the further detected spoken text is stored in a text format in the documentation memory.

* * * * *